L. KNOTT.
METALLIC WEATHER STRIP.
APPLICATION FILED DEC. 9, 1911.
1,040,355.
Patented Oct. 8, 1912.
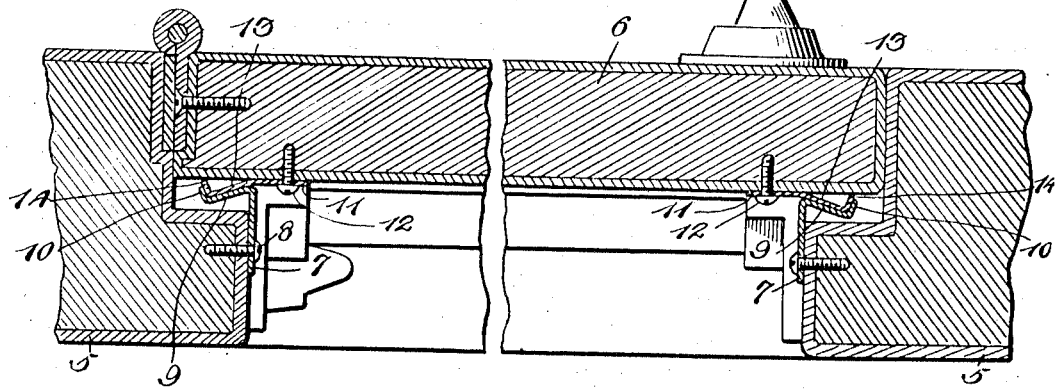
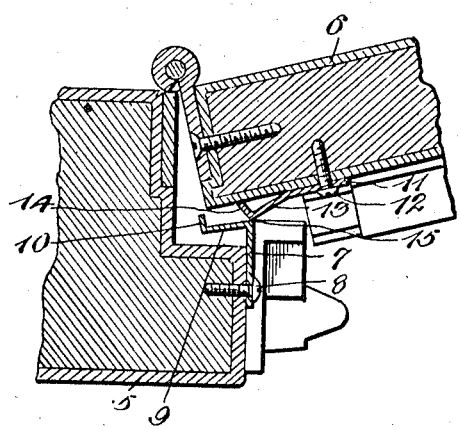
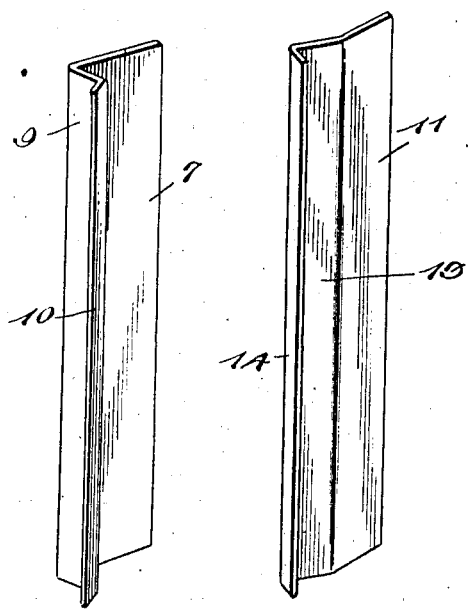
Witnesses
Chas. L. Griesbauer.
G. B. Norton.
Inventor
Levi Knott,
By Watson E. Coleman
Attorney

UNITED STATES PATENT OFFICE.

LEVI KNOTT, OF ALTOONA, PENNSYLVANIA.

METALLIC WEATHER-STRIP.

1,040,355.

Specification of Letters Patent.

Patented Oct. 8, 1912.

Application filed December 9, 1911. Serial No. 664,871.

*To all whom it may concern:*

Be it known that I, LEVI KNOTT, a citizen of the United States, residing at Altoona, in the county of Blair and State of Pennsylvania, have invented certain new and useful Improvements in Metallic Weather-Strips, of which the following is a specification, reference being had to the accompanying drawings.

This invention relates to metallic weather strips and more particularly to a device of this character which is primarily designed for use upon car doors to provide an absolutely water and air-tight joint between the door and its frame when the door is closed.

The principal object of the invention is to provide a metallic weather strip for the above purpose which is capable of withstanding the severe usage to which car doors are subjected, and the serviceability of which is limited only by the period of usefulness of the car itself.

A still further and more specific object of the invention resides in the provision of a weather strip which is especially designed for use upon the side or vertical edges of the door and its frame and which consists of complementary metallic strips having co-engaging portions, the strip secured to the frame having an unattached yieldable joint portion to effect a close frictional contact between the complementary strips when the door is closed whereby the entrance of water or air between the door and its frame is effectually prevented.

With the above and other objects in view, the invention consists of the novel features of construction, combination and arrangement of parts hereinafter fully described and claimed, and illustrated in the accompanying drawings, in which—

Figure 1 is a horizontal section through the door frame and door of a car showing the same provided with my improved metallic weather strip; Fig. 2 is a similar view through one side of the door and its frame showing the door partly open; and Figs. 3 and 4 are detail fragmentary perspective views of the metallic strips.

Referring in detail to the drawing 5 designates the vertical angle bars of the metal door frame which are mounted in the side of the car body in any approved manner. Upon these bars the door 6 is hingedly mounted at one edge for swinging movement into and out of the frame. To the vertical angle bars 5 the metallic strips 7 are secured by suitable bolts or other fastening devices indicated at 8, said strips extending the entire length of said bars or from the top to the bottom of the door frame. The bars 5 as shown are of substantially Z-shaped form in cross section, though it will of course be understood that the present invention is not limited to this specific form of frame bar. The strips 7 are secured to the frame bars adjacent one of their longitudinal edges, the other edge portions of said strips projecting inwardly from the frame bars and being disposed at an acute angle to the body of the strip as indicated at 9. The extreme free edge portion of the strip is inwardly disposed from the frame bar at right angles to the portion 9 of said strip as indicated at 10. The metallic strip is thus bent or formed by rolling the same, and the free edge portion thereof has a certain amount of inherent resiliency or spring action, the angularly disposed portion 9 thereof tending to hold the edge of the strip in spaced relation to the frame bar 5.

A complementary metallic strip 11 is rigidly secured adjacent one of its longitudinal edges to each vertical edge of the door 6 upon its outer face as indicated at 12. These strips are bent at a point substantially intermediate of their edges to dispose the same outwardly at an angle to the face of the door as indicated at 13, and the unattached longitudinal edges of said strips are flanged as indicated at 14, the resiliency of the metal closely holding the edges of said flanges against the face of the door.

When the door 6 is forced into the frame to its closed position, the portions 13 thereof engage with the angularly disposed edge portions 9 of the strips 7. It will be observed from reference to Fig. 2 that the strip 11 on the hinged edge of the door is first brought into engagement with the strip on the door frame at the corner indicated at 15 which is formed by the provision of the flange 14 on the edge of said strip. This corner of the metallic strip 11 engages the portion 9 of the strip 7 and forces the same outwardly toward the frame bar 5. Owing to the resiliency of the free angularly disposed portion 9 of the strip 7 hereinbefore referred to, it will be obvious that the tendency of the strip to assume its normal condition will cause the opposed faces of the portions 9 and 10 and 13, 14 of the respective strips to have close mutual contact so that the possibility of air or water finding its way between said strips will be rendered absolutely impossible. The angularly disposed corresponding portions 9 and 13 of the metallic strips at the free edge of the door and its frame respectively, come directly into contact throughout their entire area, there being no sliding engagement between the same as at the hinged edge of the door. Owing to the resiliency of the strip 7 a perfectly tight joint is, however, formed at the free edge of the door when the same is moved into the frame to its full closed position.

By means of the above construction, it will be readily seen that even though the metallic strips upon the door frame became bent or distorted so that the free edge portions thereof were disposed out of their proper positions, the efficiency of the device would be in no wise impaired as the coacting portions of the complementary strips on the door would move the free portions of the strips on the frame outwardly to their proper positions whereby close contact between the strips would be assured. Furthermore, if the angularly disposed portions 9 of the strip 7 were bent to a position at right angles to the body of the strips, they would not interfere with the proper closing of the door or prevent the forming of a tight joint between the same and its frame, the flanges 9 and 14 on the edges of said strips serving to prevent the entrance of water or air into and between the intermediate engaged portions of the complementary strips under any and all conditions.

From the foregoing it is thought that the construction and operation of my improved weather strip will be fully understood.

While the invention is primarily designed for use upon car doors which are subjected to rough and severe usage, it will be understood that the invention is applicable as well to house doors or any other constructions to which such a weather strip would be found well adapted and desirable. In its use in connection with the doors of metallic cars, it will effectually prevent the entrance of water between the door and its frame when the boiler is supplied with water from a trough arranged between the tracks. When the water is taken up in the movement of the engine at high speed, it is sprayed in all directions and it has heretofore been a very objectionable feature of such feed devices in that the spray found its way between the door and its frame to the interior of the car. My invention provides a complete and efficient remedy for these objectionable conditions. The device in no wise interferes with the ease and quick closing or opening movement of the door in its frame, there being no binding thereof while at the same time the objects for which the invention is devised are fully carried out. The invention may also be readily manufactured at small cost and applied to cars of the construction now in general use without requiring any material changes whatever therein. It is also practically indestructible in use, the durability thereof being equal to that of the car itself.

While I have disclosed in the foregoing description the preferable embodiment of the invention, it will be understood that the same is susceptible of many minor modifications without departing from the essential feature or sacrificing any of the advantages thereof.

Having thus described the invention what is claimed is:—

1. The combination with a frame and a door mounted for swinging movement therein, of complementary metallic strips secured to the frame and to one face of the door respectively, said strips upon the door being rigidly secured thereto at one of their edges, the other edges of said strips being outwardly inclined from the face of the door and having flanges thereon, said flanges engaging the door whereby a substantially rigid projection on the door face is formed, the complementary strips upon the door frame having unsecured resilient portions provided with flanges, the flanges on said latter strips being engaged by the flanges on the rigid inclined edge portions of the door strips when the door is closed and maintained in close engagement therewith by the resiliency of said frame strips.

2. The combination with a frame and a door mounted for swinging movement therein, of complementary metallic strips secured to the door and its frame, the strips upon the door having outwardly inclined rigid portions provided with flanges on their edges extending inwardly and engaging the face of the door, the strips upon the door frame also having resilient inclined portions provided with flanges forming a yieldable abutment for the door strips when the door is closed.

3. The combination with a frame and a door mounted for swinging movement therein, of metallic strips secured to the outer face of the door at its vertical edges, said strips being bent at a point intermediate of their longitudinal edges and outwardly inclined from the face of the door, the free edges of said inclined portions of the strips having flanges formed thereon extending inwardly and contacting with the face of the door, and metallic strips rigidly fixed at one of their longitudinal edges to the sides of the door frame, the other edges of said strips being free and bent to provide resilient angularly disposed portions, the edges of said angular portions of the strips being flanged, the inclined and flanged portions of the strips upon the door and frame closely engaging when the door is moved to its closed position within the frame.

4. The combination with a frame and a door mounted to swing therein, of metallic strips secured to the outer face of the door at its vertical edges, said strips having outwardly inclined unattached portions provided with inwardly extending flanges engaging the face of the door at their edges, and metallic strips secured adjacent one of their longitudinal edges to the frame, the other edges of said strips being disposed at an acute angle with relation to the body of the plate and resiliently engageable upon the inclined portions of the strips upon said door, the acutely inclined portions of the strips on the frame also having flanges on their free edges to engage the flanges of the plates on the door whereby the co-engaged portions of said strips provide a tight joint between the door and its frame when the door is closed.

In testimony whereof I hereunto affix my signature in the presence of two witnesses.

LEVI KNOTT.

Witnesses:
P. R. SWAYNE,
H. B. SELLERS.